(12) United States Patent
Spektor

(10) Patent No.: US 9,051,965 B1
(45) Date of Patent: Jun. 9, 2015

(54) ECCENTRIC BEARING ASSEMBLIES FOR SWIVEL CASTERS

(71) Applicant: Hamilton Caster & Manufacturing Company, Hamilton, OH (US)

(72) Inventor: Yefim Spektor, Mason, OH (US)

(73) Assignee: Hamilton Caster & Manufacturing Company, Hamilton, OH (US)

( * ) Notice: Subject to any disclaimer, the term of this patent is extended or adjusted under 35 U.S.C. 154(b) by 0 days.

(21) Appl. No.: 14/199,000

(22) Filed: Mar. 6, 2014

(51) Int. Cl.
*B60B 33/00* (2006.01)
*F16C 19/50* (2006.01)

(52) U.S. Cl.
CPC .................................. *F16C 19/505* (2013.01)

(58) Field of Classification Search
CPC B60B 33/00; B60B 33/0047; B60B 33/0049; B60B 33/0057; B60B 33/006; B60B 33/0065; B60B 33/0076
USPC ............................. 16/18 R, 20, 21, 24, 46, 48
See application file for complete search history.

(56) References Cited

U.S. PATENT DOCUMENTS

| | | | | |
|---|---|---|---|---|
| 698,963 | A | | 4/1902 | Kennedy |
| 1,160,121 | A | * | 11/1915 | Allen ................................ 16/21 |
| 1,233,093 | A | * | 7/1917 | Malloy ............................. 16/21 |
| 1,882,497 | A | * | 10/1932 | Jarvis ............................... 16/21 |
| 1,885,990 | A | * | 11/1932 | Chesnutt .......................... 16/36 |
| 1,899,394 | A | | 2/1933 | Noelting et al. |
| 2,541,514 | A | | 2/1951 | Herold |
| 2,947,021 | A | * | 8/1960 | Black ............................... 16/21 |
| 2,990,191 | A | * | 6/1961 | Black ......................... 280/79.11 |
| 3,263,266 | A | * | 8/1966 | Rabelos et al. .................... 16/44 |
| 3,433,500 | A | | 3/1969 | Christensen |
| 3,547,459 | A | | 12/1970 | Lapham |
| 4,219,903 | A | * | 9/1980 | Black ............................... 16/21 |
| 4,321,727 | A | | 3/1982 | Sheiman et al. |
| 4,342,134 | A | | 8/1982 | Mickelson |
| 5,479,677 | A | * | 1/1996 | Chong ............................. 16/21 |
| 5,809,612 | A | * | 9/1998 | Finch ........................... 16/35 D |
| 6,453,212 | B1 | | 9/2002 | Asama et al. |
| 6,499,184 | B2 | | 12/2002 | Plate |
| 6,530,119 | B2 | * | 3/2003 | Yeh ................................. 16/21 |
| 6,637,071 | B2 | * | 10/2003 | Sorensen ......................... 16/32 |
| 6,880,203 | B1 | | 4/2005 | Aubin |
| 6,908,087 | B2 | | 6/2005 | Wintersgill et al. |
| 7,065,828 | B2 | | 6/2006 | Sorensen |
| 7,284,299 | B2 | * | 10/2007 | Ruckman et al. ............. 16/31 R |

(Continued)

FOREIGN PATENT DOCUMENTS

JP 04159102 6/1992

*Primary Examiner* — Roberta Delisle
(74) *Attorney, Agent, or Firm* — Wood Herron & Evans, LLP

(57) ABSTRACT

A caster includes a mounting plate, a horn having a horn base and at least one leg, a wheel axle coupled to the at least one leg and defining a rolling axis, a caster wheel coupled to the wheel axle and rotatable about the rolling axis, and an eccentric bearing assembly coupling the horn with the mounting plate. In one embodiment, the bearing assembly includes first, second, and third rings of rolling elements, defining first, second, and third horizontal bearing planes, respectively. The second and third rings of rolling elements are positioned eccentrically within the first ring of rolling elements. In another embodiment, the first bearing plane extends between the second and third bearing planes. A transport vehicle includes a vehicle body and at least one swivel caster having an eccentric bearing assembly.

19 Claims, 6 Drawing Sheets

(56) References Cited

U.S. PATENT DOCUMENTS

| | | | |
|---|---|---|---|
| 7,383,611 B2* | 6/2008 | Foster | 16/20 |
| 8,387,209 B2* | 3/2013 | Aubin | 16/31 R |
| 2005/0081329 A1* | 4/2005 | Tsai | 16/18 R |
| 2006/0059656 A1* | 3/2006 | Hackett | 16/20 |
| 2006/0200937 A1* | 9/2006 | Ruckman et al. | 16/20 |
| 2010/0107360 A1* | 5/2010 | Shih | 16/21 |
| 2010/0247281 A1 | 9/2010 | Kempf | |
| 2012/0042472 A1* | 2/2012 | Aubin | 16/46 |

* cited by examiner

ECCENTRIC BEARING ASSEMBLIES FOR SWIVEL CASTERS

TECHNICAL FIELD

The present invention relates generally to casters. More particularly, the invention relates to bearing assemblies for swivel casters.

BACKGROUND

Casters are commonly attached to transport vehicles, such as carts, trailers, trucks, or dollies, and allow for rolling movement of the transport vehicle along a ground surface. Casters generally include a horn, also referred to as a yoke, having a pair of legs that extend downwardly and support a caster wheel that rolls along the ground surface.

Casters may be permitted to rotate about a vertical axis (termed "swivel"), or they may be fixed or restricted (termed "rigid"). Swivel casters generally include a horn base that is rotatably coupled with a mounting plate or a stem such that the horn and caster wheel may swivel about the vertical axis relative to the caster mounting plate or stem. This swiveling action allows for multi-directional rolling movement of the caster wheel, which enables steering and turning of the vehicle and thereby enhances vehicle maneuverability. In contrast, rigid casters include a horn that is rigidly attached to the mounting plate, such that the horn and caster wheel are fixed relative to the mounting plate and do not rotate about a vertical axis. Transport vehicles may be fitted with one or more swivel casters and one or more rigid casters depending on the application and transport design. In a common arrangement, a vehicle may include swivel casters on an rear, operator-end of the vehicle, and rigid casters on the front, opposing end of the vehicle. For improved vehicle maneuverability in tight spaces, the vehicle may be provided with swivel casters at both vehicle ends. An example of this is a common furniture dolly or a grocery cart.

A problem common to vehicles equipped with multiple swivel casters is the propensity of the swivel casters to "lock up" and thereby create significant resistance to rolling movement of the vehicle. Such "locking up" may occur when the vehicle is temporarily brought to rest and at least two casters are allowed to swivel to positions in which two or more caster wheels become substantially misaligned, such that the caster wheel of one caster is oriented in one direction of travel and the caster wheel of an opposing caster is oriented in a different direction of travel. Such "locking up" of the swivel casters may also occur upon attempts by the operator at sudden and substantial changes in direction of travel of the vehicle. For example, when a vehicle having four swivel casters is pushed toward a wall such that the cart abuts the wall, it may then become difficult to slide the cart along the wall to reposition it. In any such case, a substantial force by an operator may be required to "break" the locked condition of the swivel casters, thereby creating risk of injury to the operator. These problems are often magnified when the swivel casters are heavily loaded in a vertical direction, as is often the case with heavy-duty swivel casters used in industrial applications.

The "locking up" effect described above is due primarily to the concentric bearing design of conventional swivel casters, which defines a single vertical swivel axis. Prior attempts to remedy the above-described drawbacks have yielded swivel casters having two swivel axes defined by two separate, non-overlapping bearing assemblies spaced apart from each other, thereby presenting a bulky structural design. Accordingly, there is a need for an improved swivel caster that addresses the "locking up" difficulty of conventional swivel casters when mounted on a vehicle, while also presenting a compact structural design that is suitable for heavy-duty, industrial applications.

SUMMARY

An exemplary embodiment of a caster includes a mounting plate adapted to be mounted to a vehicle, a horn having a horn base and at least one leg extending away from the horn base, a wheel axle coupled to the at least one leg and defining a rolling axis, a caster wheel coupled to the wheel axle and rotatable about the rolling axis, and a bearing assembly coupling the horn with the mounting plate. The bearing assembly includes a first ring of rolling elements, a second ring or rolling elements, and a third ring or rolling elements. The second ring of rolling elements and the third ring of rolling elements are positioned eccentrically within the first ring of rolling elements.

A caster according to another embodiment includes a mounting plate adapted to be mounted to a vehicle, a horn having a horn base and at least one leg extending away from the horn base, a wheel axle coupled to the at least one leg and defining a rolling axis, a caster wheel coupled to the wheel axle and rotatable about the rolling axis, and a bearing assembly coupling the horn with the mounting plate. The bearing assembly includes a first ring of rolling elements and a second ring of rolling elements encircled by the first ring of rolling elements. The first ring of rolling elements defines a first bearing plane and the second ring of rolling elements defines a second bearing plane, and the second bearing plane extends between the first bearing plane and the mounting plate.

A transport vehicle configured to move along a ground surface includes a vehicle body and at least one swivel caster coupled to the vehicle body with a mounting plate. The at least one swivel caster includes an eccentric bearing assembly having a first ring of rolling elements and a second ring of rolling elements positioned eccentrically within the first ring of rolling elements. The first ring of rolling elements defines a first bearing plane and the second ring of rolling elements defines a second bearing plane, and the second bearing plane extends between the first bearing plane and the mounting plate.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
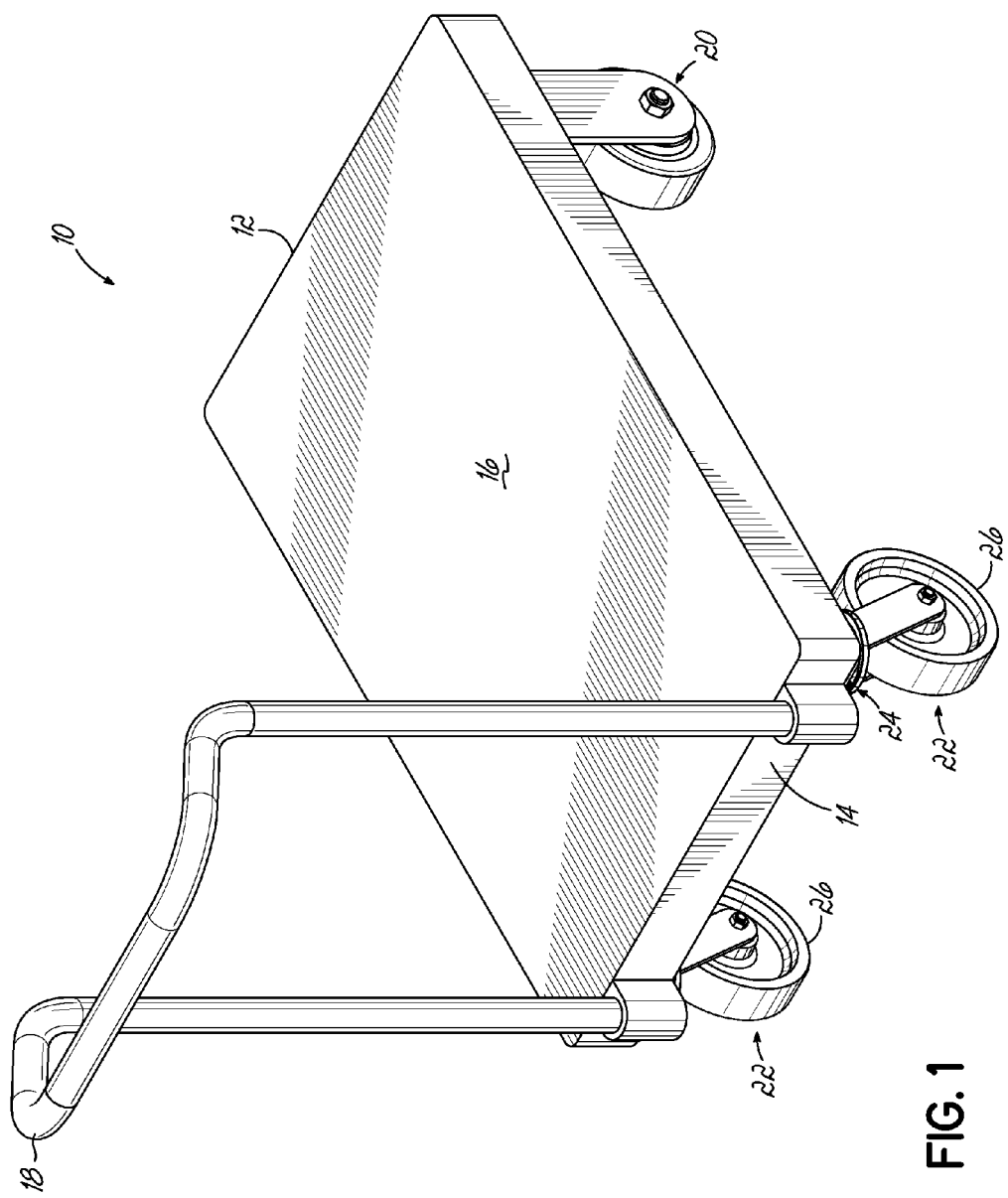
FIG. 1 is an isometric view of a transport vehicle fitted with two swivel casters and two rigid casters.

Referring to the figures, and beginning with FIG. 1, a transport vehicle is shown in the form of a standard platform truck 10 having a front end 12, a rear end 14, a platform 16, and a transport bar 18. The platform truck 10 is provided at its front end 12 with a pair of rigid casters 20 and at its rear end 14 with a pair of swivel casters 22 having eccentric bearing assemblies 24. One of the rigid casters 20 is hidden from view. The platform 16 is configured to receive a load of one or more objects for transportation by the truck 10 along a ground surface. The transport bar 18, as shown, may be in the form of a pipe handle and an operator may exert a pushing or pulling force thereon for moving the truck 10 in a desired direction.

Figure 1A:
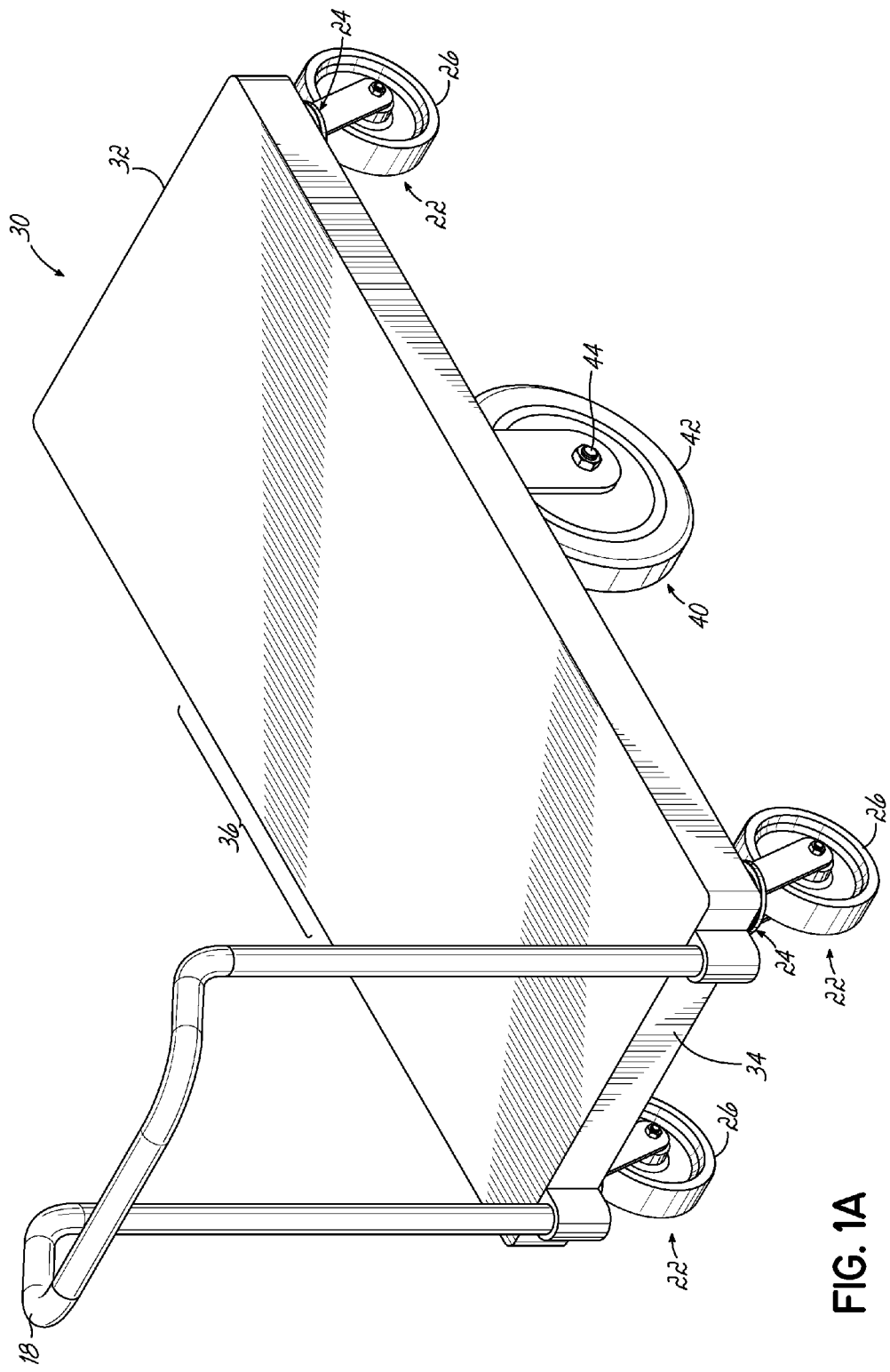
FIG. 1A is an isometric view of a transport vehicle fitted with four swivel casters and two rigid load casters.

While the transport vehicle is shown in FIG. 1 as a standard platform truck 10 having four casters, the transport vehicle may be any other suitable vehicle adapted to include any number of casters for providing rolling movement along a ground surface, such as any truck, cart, trailer, or dolly. For example, FIG. 1A shows a transport vehicle in the form of a tilt truck 30 having six casters. A front end 32 and rear end 34 of the tilt truck 30 each include two swivel casters 22 having eccentric bearing assemblies 24, one of the swivel casters 22 at the front end 32 being hidden from view. A middle portion 36 of the tilt truck 30 includes two rigid load casters 40, one being hidden from view. As shown, the rigid load casters 40 each include a load caster wheel 42 (referred to as a "load wheel") having a diameter that is greater in dimension than that of a swivel caster wheel 26 of any of the swivel casters 22. Accordingly, the load wheels 42 continuously contact the ground surface on which the tilt truck 30 sits, and the tilt truck 30 may pivot about a horizontal axis (not shown) defined by load wheel axles 44 such that the swivel caster wheels 26 provided at either the front end 32 or the rear end 34 of the tilt truck 30 also contact the ground surface. As such, ideally only four casters of the tilt truck 30 contact the ground surface at any one time.

Figure 2:
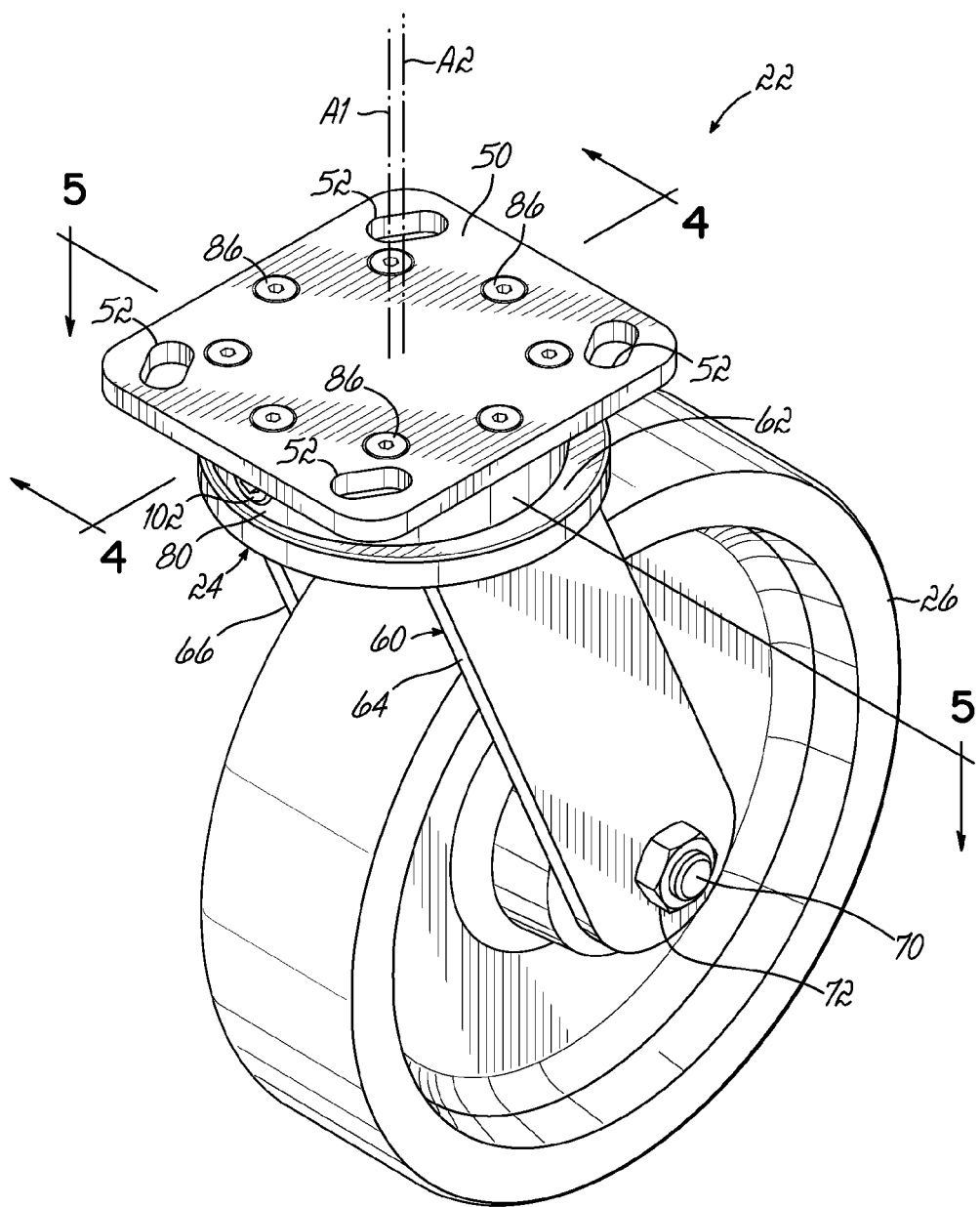
FIG. 2 is an isometric view of a swivel caster including an eccentric bearing assembly according to an embodiment of the invention.

Referring to FIG. 2, an exemplary embodiment of the swivel caster 22 including an eccentric bearing assembly 24 is shown. The caster 22 includes a mounting plate 50 and a horn 60 that is rotatably coupled to the mounting plate 50 with the eccentric bearing assembly 24. The horn 60 may swivel relative to the mounting plate 50 about a primary swivel axis A1 and secondary swivel axis A2, the swivel axes A1, A2 being substantially vertical and parallel to each other. The mounting plate 50 includes a plurality of mounting slots 52 for mounting the swivel caster 22 to a transport vehicle, as shown in FIGS. 1 and 1A. The horn 60 includes a horn base 62 and a pair of legs 64, 66 that are securely attached to the horn base 62, for example by welds (not shown). The legs 64, 66 extend downwardly from the horn base 62 at an angle and include a pair of opposed axle holes (not shown) for receiving a wheel axle 70. The wheel axle 70 is coupled to the legs 64, 66 with at least one axle nut 72 and defines a substantially horizontal axis (not shown). The caster wheel 26 is coupled to legs 64, 66 with the wheel axle 70 and is rotatable about the horizontal axis defined by the wheel axle 70, thereby enabling rolling movement of the caster 22 in a direction in which the caster wheel 26 is aligned.

The caster wheel 26 may be of any size, shape, and material suitable for the application and the environment in which the caster 22 is operated. Suitable materials for the wheel 26 may include any metals or polymers of varying hardness, including plastics, polyurethanes, and rubbers. For example, the wheel 26 may include a cast iron center portion and a polyurethane tread applied to the outer circumference of the center portion. In other embodiments (not shown), the caster 22 may be provided with multiple caster wheels, such as caster wheel 26, arranged beside each other.

Figure 3:
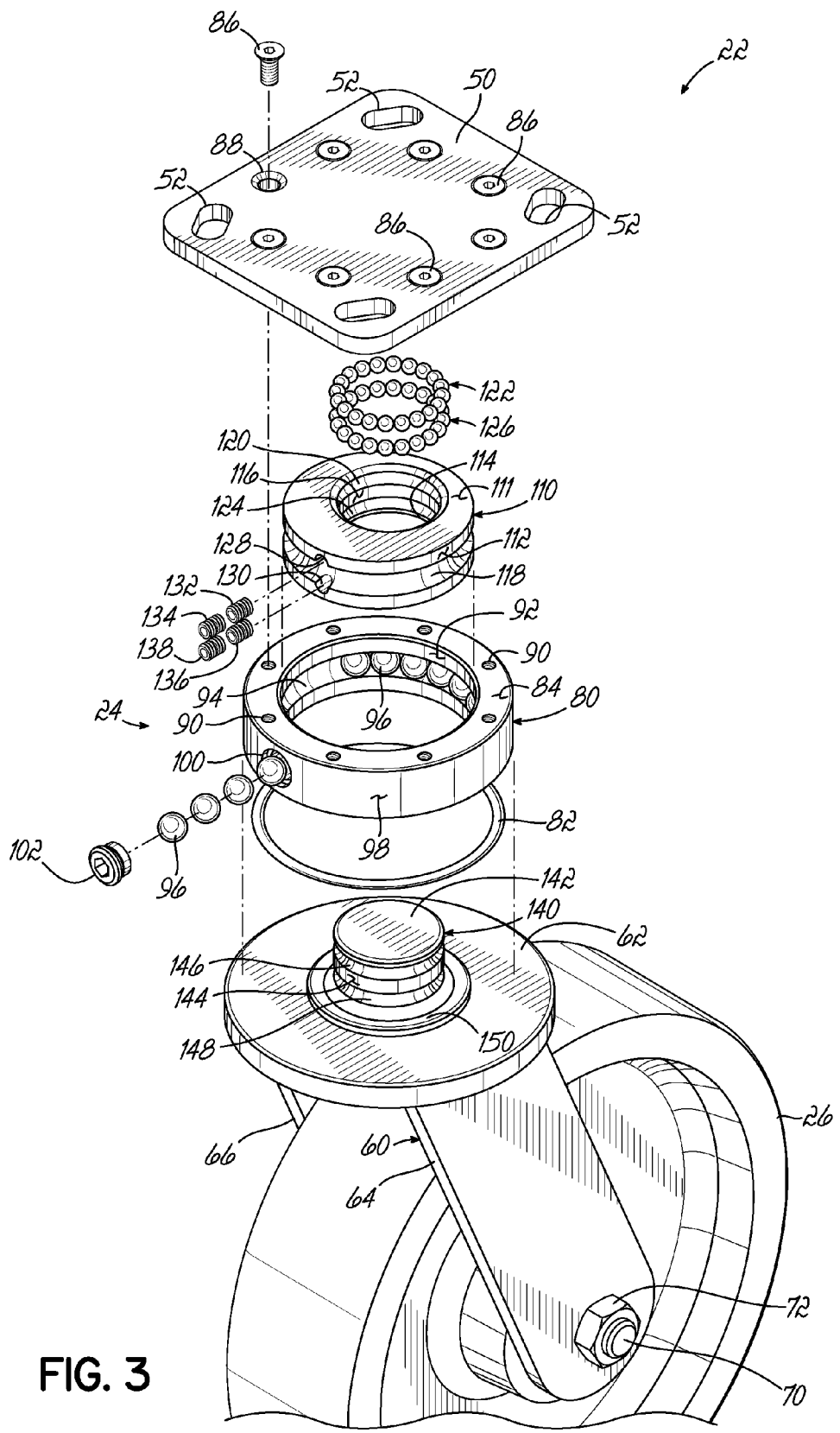
FIG. 3 is a partially disassembled view of the caster and eccentric bearing assembly of FIG. 2.

FIG. 3 shows a partially disassembled view of the swivel caster 22 and its eccentric bearing assembly 24. The eccentric bearing assembly 24 enables swiveling movement of the caster wheel 26 relative to the mounting plate 50 and the vehicle (not shown) to which the caster 22 is mounted. Starting from a radially outer position, the eccentric bearing assembly 24 includes an outer ring 80 that is positioned between the mounting plate 50 and the horn base 62. A bottom surface (not shown) of the outer ring 80 overlies the horn base 62 and is separated therefrom by a bearing seal 82. A top surface 84 of the outer ring 80 is coupled to the mounting plate 50 with any suitable mechanical fastening means, such as a plurality of screws 86. As shown, the mounting plate 50 includes a plurality of through holes 88 arranged circularly and extending axially through a thickness of the mounting plate 50. Each through hole 88 aligns with a corresponding threaded hole 90 that extends axially through the top surface 84 of the outer ring 80, such that the screws 86 may be inserted downwardly through the through holes 88 and threaded into the threaded holes 90 to thereby rigidly couple the outer ring 80 to the mounting plate 50.

An inner radial surface 92 of the outer ring 80 includes an outer primary ball race 94 for engaging and retaining a plurality of primary bearing balls 96 within the bearing assembly 24. An outer radial surface 98 of the outer ring 80 includes a primary ball port 100 that extends radially through the outer ring 80 and opens to the outer primary ball race 94. The primary ball port 100 is sized such that the primary bearing balls 96 may be inserted therethrough and passed into the outer primary ball race 94 when assembling the eccentric bearing assembly 24. A primary plug 102 is inserted into and preferably threadedly engaged with the primary ball port 100 after the primary bearing balls 96 have been loaded into the bearing assembly 24, as shown in FIG. 3.

A generally disk-shaped eccentric adapter 110 is positioned radially inward of the outer ring 80 and includes an outer radial surface 112 and an eccentrically positioned inner bore 114 that extends axially through the eccentric adapter 110 and defines an inner radial surface 116. When assembled, the outer radial surface 112 of the eccentric adapter 110 sits adjacent to and opposes the inner radial surface 92 of the outer ring 80. Furthermore, the outer radial surface 112 of the eccentric adapter 110 includes an inner primary ball race 118 that is aligned with and cooperates with the outer primary ball race 94 to thereby engage and retain the primary bearing balls 96 in the form of a ring within the bearing assembly 24. The inner radial surface 116 of the eccentric adapter 110 is positioned eccentrically relative to the outer radial surface 112 and includes an upper outer secondary ball race 120 configured to engage and retain a plurality of upper secondary bearing balls 122, and further includes a lower outer secondary ball race 124 configured to engage and retain a plurality of lower secondary bearing balls 126.

An upper secondary ball port 128 and a lower secondary ball port 130 each extends radially through the outer radial surface 112 of the eccentric adapter 110 and opens to the upper and lower outer secondary ball races 120, 124, respectively. The secondary ball ports 128, 130 are sized such that the upper and lower secondary bearing balls 122, 126, respectively, may be inserted therethrough and passed into the upper and lower outer secondary ball races 120, 124, respectively, when assembling the eccentric bearing assembly 24. Inner and outer upper secondary plugs 132 and 134 are inserted into and preferably threadedly engaged with the upper secondary ball port 128 after the upper secondary bearing balls 122 have been loaded into the bearing assembly 24 through the upper secondary ball port 128. In a similar manner, inner and outer lower secondary plugs 136 and 138 are inserted into and preferably threadedly engaged with the lower secondary ball port 130 after the lower secondary ball bearings 126 have been loaded into the bearing assembly 24. Each of the outer secondary plugs 134, 138 is inserted after the corresponding inner secondary plug 132, 136 so as to radially abut the inner secondary plug 132, 136 in locking engagement.

A core column 140 extends axially from the horn base 62 toward the mounting plate 50. During assembly, the core column 140 is positioned within the inner bore 114 of the eccentric adapter 110 such that a top surface 142 of the core column 140 sits substantially flush with a top surface 111 of the eccentric adapter 110, and an outer radial surface 144 of the core column 140 sits adjacent to and opposes the inner radial surface 116 of the eccentric adapter 110. The outer radial surface 144 of the core column 140 includes an upper inner secondary ball race 146 that is aligned with and cooperates with the upper outer secondary ball race 120 to thereby engage and retain the upper secondary bearing balls 122 in the form of a ring within the bearing assembly 24. The core column 140 further includes a lower inner secondary ball race 148 that is aligned with and cooperates with the lower outer secondary ball race 124 to thereby engage and retain the lower secondary bearing balls 126 in the form of a ring within the bearing assembly 24.

As shown in the figures, the upper and lower secondary bearing balls 122, 126 are of substantially the same diameter, though they may be of different diameters as preferred depending on the desired application. The secondary bearing balls 122, 126 are preferably of a smaller diameter than the primary bearing balls 96, which allows for a compact overall design of the eccentric bearing assembly 24. Moreover, including dual, upper and lower sets of secondary ball races 120, 124, 146, 148 provides for a better distribution of radial forces transmitted between the core column 140, the eccentric adapter 110, and the outer ring 80, as compared to a bearing design including only a single set of secondary ball races.

As shown best in FIG. 3, each of the ball races 94, 118, 120, 124, 146, 148 defines a groove extending circumferentially about its corresponding radial surface 92, 112, 116, 144 and having a semi-circular cross-section with a radius corresponding to the radius of the respective bearing balls 96, 122, 126 being engaged and retained. Accordingly, the pluralities of bearing balls 96, 122, 126 are each formed into the shape of a ring when loaded into the bearing assembly 24 and retained by their respective ball races 94, 118, 120, 124, 146, 148. While bearing balls 96, 122, 126 are shown and described herein, persons of ordinary skill in the art will appreciate that the eccentric bearing assembly 24 may be modified to incorporate any other type of rolling element desired, such as tapered cylindrical rollers, for example.

Figure 4:
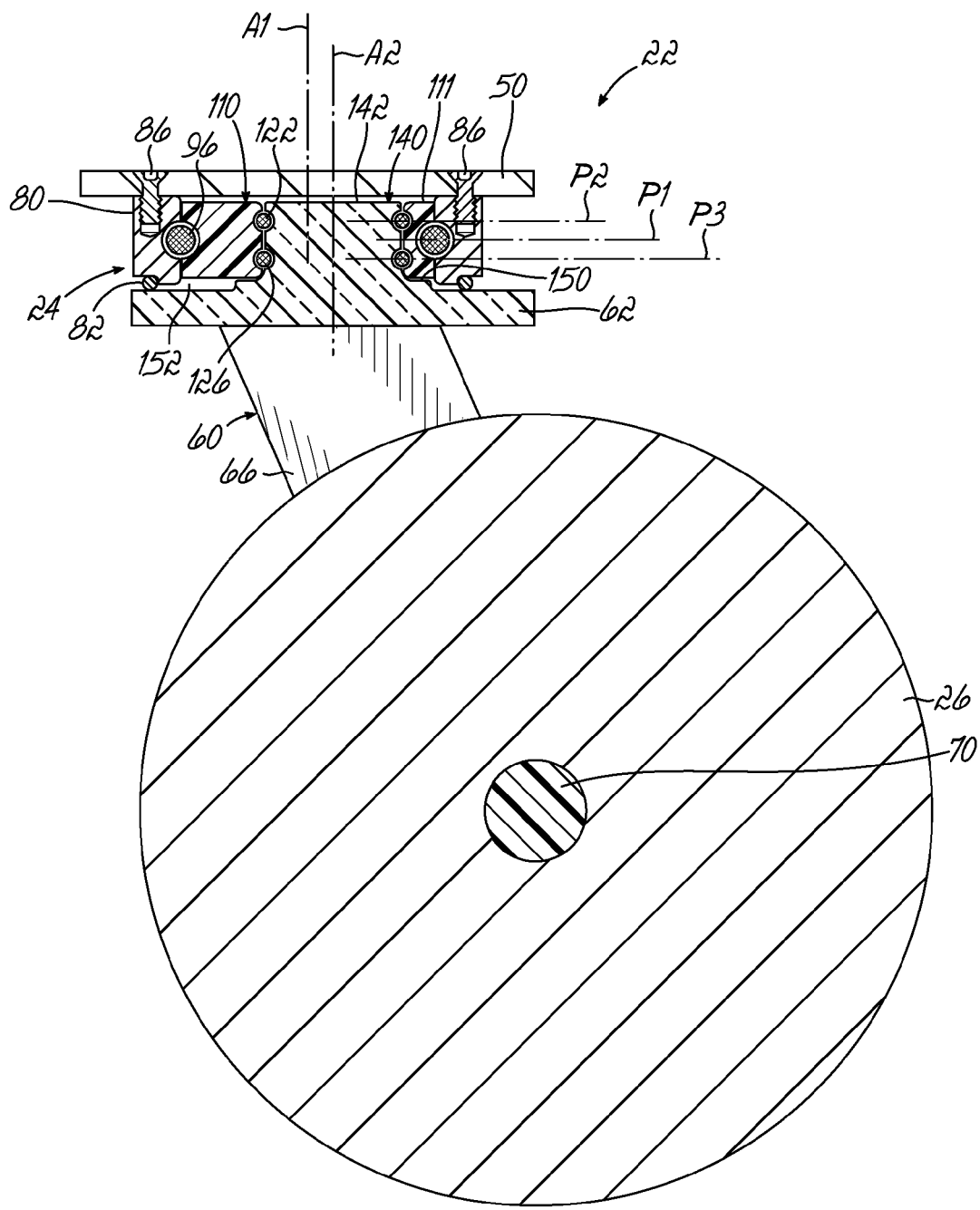
FIG. 4 is a side cross-sectional view of the swivel caster and eccentric bearing assembly, taken along section line 4-4 of FIG. 2.

FIG. 4 shows a side cross-sectional view of the eccentric bearing assembly 24 in an assembled configuration. As shown, the outer ring 80 is fixed to the mounting plate 50 with screws 86, the eccentric adapter 110 is received within the outer ring 80 and rotatably coupled thereto with primary bearing balls 96, and the core column 140 of the horn 60 is received within the inner bore 114 of the eccentric adapter 110 and rotatably coupled thereto with upper and lower secondary bearing balls 122, 126. The ring of upper secondary bearing balls 122 is positioned coaxially with the ring of lower secondary bearing balls 126. Accordingly, the eccentric adapter 110 is rotatable relative to the outer ring 80 about the substantially vertical, primary swivel axis A1, and the core column 140 and the horn 60 from which it extends are rotatable relative to the eccentric adapter 110 about the substantially vertical, secondary swivel axis A2. This configuration enables the caster wheel 26 to swivel about swivel axis A1 and swivel axis A2, simultaneously or independently. As shown, the swivel axes A1, A2 are offset from each other in an axial direction, and each swivel axis A1, A2 is positioned radially inward of the inner secondary ball races 146, 148 such that they extend through the core column 140. Accordingly, the eccentric bearing assembly 24 presents a structure that is compact in a radial direction.

As best shown in FIG. 4, a primary bearing plane P1 is that which horizontally bisects the ring of primary bearing balls 96. Similarly, an upper secondary bearing plane P2 is that which horizontally bisects the ring of upper secondary bearing balls 122, and a lower secondary bearing plane P3 is that which horizontally bisects the ring of lower secondary bearing balls 126. The rings of primary and secondary bearing balls 96, 122, 126 are positioned such that the primary bearing plane P1 extends horizontally between the upper and lower secondary bearing planes P2, P3 with equidistant spacing in an axial direction. Moreover, the upper secondary bearing plane P2 extends horizontally between the primary bearing plane P1 and the mounting plate 50, and the lower secondary bearing plane P3 extends horizontally between the primary bearing plane P1 and the horn base 62. Accordingly, the eccentric bearing assembly 24 presents a structure that is compact in an axial direction as well.

Also shown in FIGS. 3 and 4, the horn base 62 includes an annular shoulder 150 extending axially from the horn base 62 toward the eccentric adapter 110 and encircling the core column 140. The shoulder 150 defines an annular gap 152 in which a bearing lubricant (not shown) may reside for lubricating the internal components of the bearing assembly 24. The bearing seal 82 is positioned between the outer ring 80 and the horn base 62 and operates to retain lubricant within and block any external contaminants from entering the bearing assembly 24.

Figure 5:
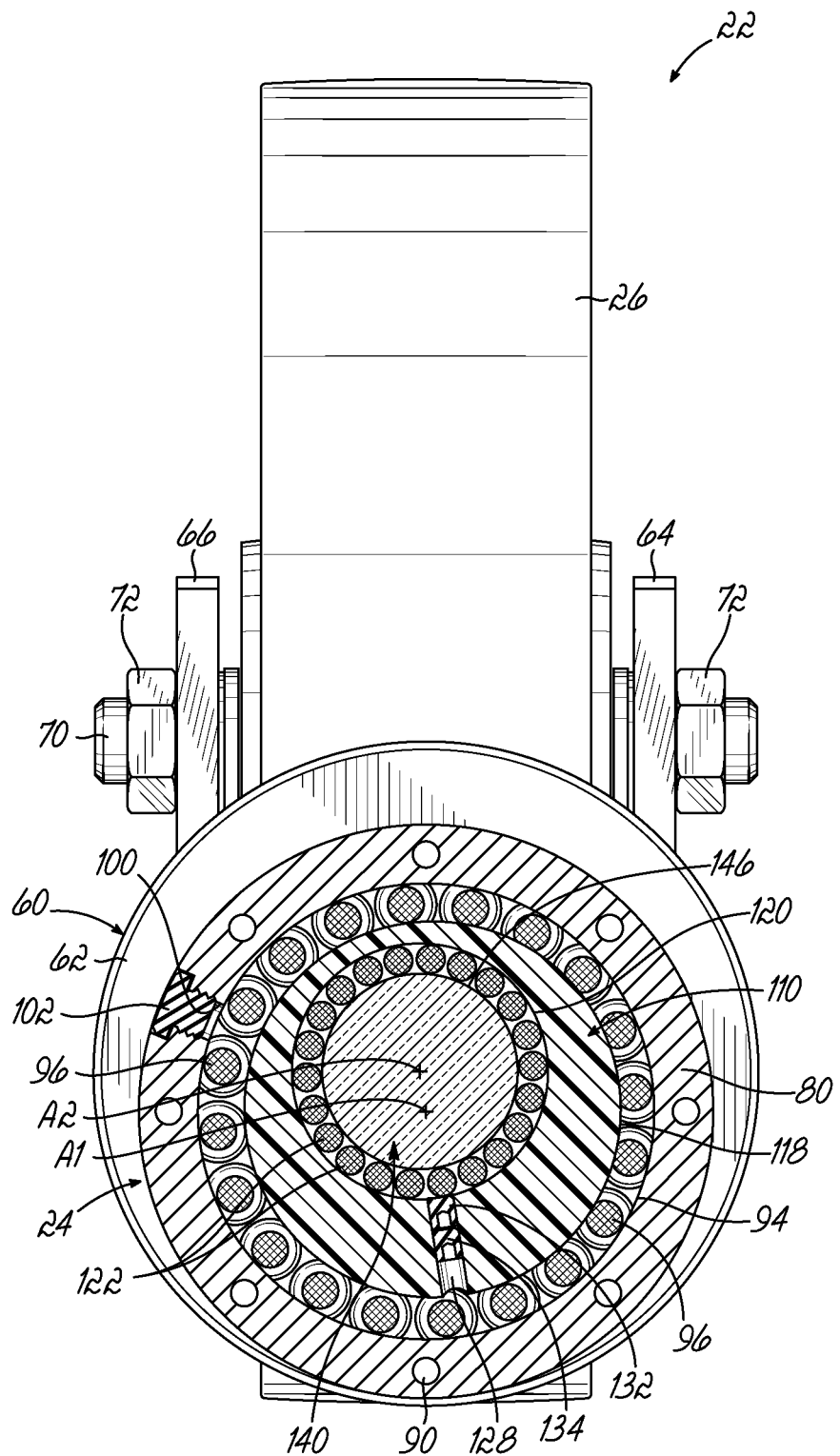
FIG. 5 is a top cross-sectional view of the swivel caster and eccentric bearing assembly taken along section line 5-5 of FIG. 2.

FIG. 5 is a top cross-sectional view of the bearing assembly 24, showing the components described above with the exception of the mounting plate 50. As shown, the ring of upper secondary bearing balls 122 is positioned radially inward of and encircled by the ring of primary bearing balls 96 such that that they form eccentric circles. The ring of lower secondary bearing balls 126 is not seen in FIG. 5 in view of its coaxial alignment with the ring of upper secondary bearing balls 122.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A caster comprising:
   a mounting plate adapted to be mounted to a vehicle;
   a horn having a horn base and at least one leg extending away from the horn base;
   a wheel axle coupled to the at least one leg and defining a rolling axis;
   a caster wheel coupled to the wheel axle and rotatable about the rolling axis; and
   a bearing assembly coupling the horn with the mounting plate, the bearing assembly including a first ring of rolling elements, a second ring of rolling elements, and a third ring of rolling elements,
   wherein the second ring of rolling elements and the third ring of rolling elements are positioned eccentrically within the first ring of rolling elements.

2. The caster of claim 1, wherein the first ring of rolling elements defines a first bearing plane, the second ring of rolling elements defines a second bearing plane, and the third ring of rolling elements defines a third bearing plane, and the first bearing plane extends between the second bearing plane and the third bearing plane.

3. The caster of claim 2, wherein the first bearing plane is spaced equidistantly from the second bearing plane and the third bearing plane.

4. The caster of claim 1, wherein the first ring of rolling elements includes rolling elements each having a first diameter, the second ring of rolling elements includes rolling elements each having a second diameter, and the third ring of rolling elements includes rolling elements each having a third diameter, and the first diameter is different in dimension than at least one of the second diameter or the third diameter.

5. The caster of claim 4, wherein the second diameter is equal in dimension to the third diameter.

6. The caster of claim 1, wherein the bearing assembly further includes an adapter having an outer radial surface configured to engage the first ring of rolling elements and an inner radial surface configured to engage the second ring of rolling elements and the third ring of rolling elements.

7. The caster of claim 6, wherein the inner radial surface of the adapter is positioned eccentrically relative to the outer radial surface of the adapter.

8. The caster of claim 7, wherein the inner radial surface of the adapter defines a bore sized to receive a column extending from the horn base.

9. The caster of claim 7, wherein the column has an outer radial surface configured to engage the second ring of rolling elements and the third ring of rolling elements.

10. A caster comprising:
    a mounting plate adapted to be mounted to a vehicle;
    a horn having a horn base and at least one leg extending away from the horn base;
    a wheel axle coupled to the at least one leg and defining a rolling axis;
    a caster wheel coupled to the wheel axle and rotatable about the rolling axis; and
    a bearing assembly coupling the horn with the mounting plate, the bearing assembly including a first ring of rolling elements and a second ring of rolling elements encircled by the first ring of rolling elements and positioned eccentrically relative to the first ring of rolling elements,
    wherein the first ring of rolling elements defines a first bearing plane and the second ring of rolling elements defines a second bearing plane, and the second bearing plane extends between the first bearing plane and the mounting plate.

11. The caster of claim 10, wherein the first ring of rolling elements includes rolling elements each having a first diameter and the second ring of rolling elements includes rolling elements each having a second diameter, and the first diameter is different in dimension than the second diameter.

12. The caster of claim 10, wherein the bearing assembly further includes a third ring of rolling elements encircled by the first ring of rolling elements.

13. The caster of claim 12, wherein the third ring of rolling elements defines a third bearing plane, and the first bearing plane extends between the second bearing plane and the third bearing plane.

14. The caster of claim 12, wherein the third ring of rolling elements is positioned eccentrically relative to the first ring of rolling elements.

15. The caster of claim 12, wherein the bearing assembly further includes an adapter having an outer radial surface configured to engage the first ring of rolling elements and an inner radial surface configured to engage the second ring of rolling elements and the third ring of rolling elements.

16. The caster of claim 12, wherein the inner radial surface of the adapter defines a bore sized to receive a column extending from the horn base, the column configured to engage the second ring of rolling elements and the third ring of rolling elements.

17. A transport vehicle configured to move along a ground surface, comprising:
    a vehicle body; and
    at least one swivel caster coupled to the vehicle body with a mounting plate and including an eccentric bearing assembly having a first ring of rolling elements and a second ring of rolling elements positioned eccentrically within the first ring of rolling elements,
    wherein the first ring of rolling elements defines a first bearing plane and the second ring of rolling elements defines a second bearing plane, and the second bearing plane extends between the first bearing plane and the mounting plate.

18. The transport vehicle of claim 17, wherein the eccentric bearing assembly of the at least one swivel caster further includes a third ring of rolling elements positioned coaxially with the second ring of rolling elements and defining a third bearing plane, and the first bearing plane extends between the second bearing plane and the third bearing plane.

19. The transport vehicle of claim 18, wherein the eccentric bearing assembly of the at least one swivel caster further includes an adapter having an outer radial surface configured to engage the first ring of rolling elements and an inner radial surface configured to engage the second ring of rolling elements and the third ring of rolling elements.

* * * * *